United States Patent [19]

Kan et al.

[11] 4,444,236
[45] Apr. 24, 1984

[54] TIRE TREAD HAVING LOW ROLLING RESISTANCE

[75] Inventors: Masanori Kan, Amagasaki; Takuya Okazaki, Toyonaka; Tatsuo Sakashita, Suita, all of Japan

[73] Assignee: The Toyo Rubber Industry Co., Ltd., Osaka, Japan

[21] Appl. No.: 388,694

[22] Filed: Jun. 15, 1982

[30] Foreign Application Priority Data

Jun. 24, 1981 [JP] Japan ................... 56-98627

[51] Int. Cl.$^3$ .................. B60C 11/00; B60C 1/00; C08L 7/00
[52] U.S. Cl. .................. 152/209 R; 152/360; 152/374; 526/340; 525/99; 525/250
[58] Field of Search .......... 152/209, 360, 374, 330 R; 526/340; 525/99, 250

[56] References Cited

U.S. PATENT DOCUMENTS

| | | | |
|---|---|---|---|
| 4,048,427 | 9/1977 | Hargis et al. | 526/340 |
| 4,280,543 | 7/1981 | Bond et al. | 152/209 R |
| 4,334,567 | 6/1982 | Bond | 152/209 R |
| 4,346,193 | 8/1982 | Warfel | 525/250 |
| 4,349,061 | 9/1982 | Hirakawa et al. | 152/209 R |
| 4,409,368 | 10/1983 | Vitus et al. | 526/340 |
| 4,417,027 | 11/1983 | Kan et al. | 525/250 |

FOREIGN PATENT DOCUMENTS

| | | | |
|---|---|---|---|
| 56-79004 | 6/1981 | Japan | 152/374 |
| 2058687 | 4/1981 | United Kingdom | 152/209 R |

OTHER PUBLICATIONS

Blow, C. M., *Rubber Technology and Manufacture*, CRC Press 1971, pp. 89–93.

P. Luijk, "The Versatility of the Lithium-Alkyl-Initiated Copolymerisation of Styrene and Butadiene", Kautschuk & Gummi-Kunststoffe 34 Jahrang, No. 3/1982.

*Primary Examiner*—Lois E. Boland
*Attorney, Agent, or Firm*—Koda and Androlia

[57] ABSTRACT

An automotive tire tread having a low rolling resistance including a cap tread rubber and a base tread rubber wherein the value of the loss tangent of the cap tread rubber is not more than 0.24 and the value of the resilience of the cap tread rubber is more than 60%. In addition, the value of the loss tangent of the base tread rubber should be less than that of the cap tread rubber.

4 Claims, No Drawings

TIRE TREAD HAVING LOW ROLLING RESISTANCE

BACKGROUND OF THE INVENTION

The present invention relates to a radial tire for a passenger car and particularly to a radial tire for a passenger car having a low rolling resistance and more particularly it is directed to provide a tire tread which is well balanced in both performances of the rolling resistance and the wet grip.

Recently effective use of energy resources is requested throughout the world and it is also necessary to save energy resources in the use of tires. Namely, we must contribute in reducing the consumption of energy resources used by cars. It is therefore of an urgent necessity in the tire manufacturing industry to develop techniques to produce energy saving tires.

Rolling resistance of a tire is mainly caused by the inner friction of the materials of which the tire is composed, namely, the materials of tread, sidewall, carcass, and inner liner. Most of all, a tread affects the rolling resistance of a tire. Accordingly, it is most effective for obtaining low rolling resistance of a tire to reduce the energy loss caused by the compression, bending, and shearing of the rubber compound of a tread.

But it is a well-known fact that a tread composition having good wep grip performance is inforior in the rolling resistance and the two performances are incompatible with each other.

There is disclosed in the Japanese patent application laid open under No. 55-99403 that low rolling resistance as well as a high wet grip performance can be obtained in a tread rubber wherein the resilience (the percent ratio of the amount of energy used for recovering from a deformed condition to the amount of energy used for causing a sudden deformation) is more than 65% as to the tread base rubber and is less than 60% as to the tread cap rubber. In another Japanese patent application laid open under No. 55-106803, there is disclosed that the compatibility between the contradictory performances of wet grip and rolling resistance can be achieved if the loss tangent (tan $\delta$) of a cap tread rubber layer has a specific value between 0.25 and 0.5 and that of a base tread rubber layer has also a particular value less than 0.2.

In the above two patent applications, the resilience of a tread cap rubber is less than 60% or the loss tangent (tan $\delta = E''/E'$, namely, the ratio of the loss elastic modulus ($E''$) to the storage elastic modulus ($E'$)) is somewhere between 0.25 and 0.5. However, the use of the said rubber composition as a tread cap rubber gives a bad effect on the performance of the rolling resistance of a tire since the volume of a tread cap rubber becomes bigger than that of a tread base rubber so that the rolling resistance is greatly affected by the tread cap rubber. It can be said that this has resulted from the fact that consideration has been taken into the improvement of wet grip performance more than that of the performance of rolling resistance.

SUMMARY OF THE INVENTION

It is an object of the present invention to provide a tire tread having higher performances in both low rolling resistance and wet grip performance in the outer region than disclosed in the above prior two patent applications.

Namely, the present invention employs a tire tread wherein a cap tread rubber has the loss tangent (tan $\delta$) not more than 0.24 and the resilience higher than 60%. It would be understood that such a tire tread has an advantage in the low rolling resistance.

In order to maintain the wet grip performance and wear-resistance until the tire wears out, the volume of the cap tread rubber should necessarily occupy 60% to 70% of the total volume of the tread.

As the polymer material for a cap tread rubber, emulsion polymerization SBR (styrene-butadiene rubber) has been mainly used heretofore in view of maintaining a good wet grip performance, which has resulted in a low value of resilience and a high value of loss tangent (tan $\delta$). The inventors of the present invention have found that the solution polymerization star shaped SBR is more effective as the polymer material for a cap tread rubber than the polymer which has been used heretofore.

Namely, this solution polymerization star shaped SBR has the loss modulus ($E''$) lower than the conventional general-purpose emulsion polymerization SBR by less than ½ and furthermore possesses the higher resilience so that there is obtained the compatibility between the contradictory performances of rolling resistance and wet grip performance.

The said star shaped SBR gives no reversion in the vulcanization at a high temperature in a short period of time. Accordingly, the resulting vulcanizate is good in its quality, giving no bad effect on the performance of rolling resistance.

DETAILED DESCRIPTION OF THE INVENTION

Based on the embodiments, the compounds of the tire tread according to the present invention will be described as follows;

The compositions of the tread rubber compounds will be illustrated hereunder;

Table 1 indicates the compositions and the characteristic values of cap tread rubber (ab. CTR).

Table 2 indicates the compositions and the characteristic values of base tread rubber (ab. BTR).

Table 3 shows the test results comparing the rolling resistances and the wet grip performances of the tires having the combination varied between a cap tread and a base tread rubber in each of them.

TABLE 1

(Composition of Cap Tread Rubber)

| Composition No. | Parts by Weight | | | | | |
|---|---|---|---|---|---|---|
| | C-1 | C-2 | C-3 | C-4 | C-5 | C-6 |
| Component | | | | | | |
| SBR 1712 | 137.5 | | | | | |
| SBR 1502 | | 100 | | | | |
| Star Shaped SBR 45/15 | | | | 50 | | |
| Star Shaped SBR 45/11 | | | | | 100 | 50 |
| NR | | | | 50 | | 50 |
| ZnO | 3 | | | | | |
| Stearic Acid | 2.5 | | | | | |
| Aging Resistor (Santoflex 13) | 1.0 | | | | | |
| Carbon (N-339) | 80 | 45 | 45 | 45 | 45 | 45 |
| Higher Aromatic Oil | 7.5 | 5 | 5 | 5 | 5 | 5 |
| Accelarator (MSA) | 1.5 | 1.5 | 1.5 | 1.5 | 1.5 | 1.5 |
| Accelarator (D) | 0.2 | 0.2 | 0.2 | 0.2 | 0.2 | 0.2 |
| S | 2.0 | 2.0 | 2.0 | 2.0 | 2.0 | 2.0 |
| Characteristic Property | | | | | | |
| Resilience (BS-903) @ 23° C. | 44 | 55 | 64 | 63 | 65 | 64 |
| Loss Tangent @ 30° C. | 0.311 | 0.255 | 0.172 | 0.181 | 0.165 | 0.173 |

TABLE 1-continued (Composition of Cap Tread Rubber)

| Composition No. | C-1 | C-2 | C-3 | C-4 | C-5 | C-6 |
|---|---|---|---|---|---|---|
| (tan δ) | | | | | | |
| Impact Resilience (JIS) @ 23° C. | 33 | 45 | 57.5 | 54.5 | 61 | 57 |

TABLE 2

(Composition of Base Tread Rubber)

| Composition No. | B-1 | B-2 | B-3 | B-4 |
|---|---|---|---|---|
| Component | | | | |
| NR | 100 | 80 | 50 | 50 |
| BR | | 20 | | |
| Star Shaped SBR 45/10 | | | 50 | |
| Star Shaped SBR 30/12 | | | | 50 |
| ZnO | 3 | | | |
| Stearic Acid | 2.5 | | | |
| Aging Resistor (Santoflex 13) | 1.0 | | | |
| Carbon (GPF) | 35 | | | |
| Higher Aromatic Oil | 5 | | | |
| Accelarator (MSA) | 1.5 | | | |
| Accelarator (D) | 0.2 | | | |
| S | 2.0 | | | |
| Characteristic Property | | | | |
| Resilience (BS-903) @ 23° C. | 76 | 77 | 75 | 78 |
| Loss Tangent @ 30° C. (tan δ) | 0.070 | 0.063 | 0.074 | 0.060 |
| Impact Resilience (JIS) @ 23° C. | 75 | 76.5 | 74 | 77.5 |

In Table 1, the compositions No. C-1 and C-2 show conventional cap tread rubbers for comparison purpose and C-3 to C-6 are the embodiments of the present invention. Shown in Table 2 are the embodiments of base treads according to the present invention. Note:
SBR 1712—Low temperature polymerization styrene-butadiene rubber, styrene content is 23.5, the content of high aromatic oil is 37.5.
SBR 1502—linear chain polymer by emulsion polymerization, non-pollutive, cold rubber, styrene content is 23.5.
Star shaped SBR—Solution polymerization star shaped styrene-butadiene rubber.
45/15, 45/11, 45/10, 30/12—Numerators indicate the vinyl content (%) contained in butadiene. Denominators indicate the styrene content (%).
Resilience—Measured in accordance with the British Standard BS-903 at 23° C. by using the Dunlop Tripso meter.
Loss Tangent (tan δ)—Measured by using the dynamic viscoelastic spectrometer manufactured by Iwamoto Seisakusho, the frequency of 50 Hz, the dynamic strain of 5%, the temperature of 30° C.

Treads were manufactured with cap tread rubbers and base tread rubbes prepared in accordance with the compositions shown in Table 1 and Table 2 with different combinations in each other. Tires of 185/70 SR 14 were prepared by using said treads. Then, the rolling resistances and the wet grip performances of the tires were measured. The results are shown in Table 3.

TABLE 3

(Test Results of Tires)

| Characteristic Property | Sample No. | | | | | | | |
|---|---|---|---|---|---|---|---|---|
| | I | II | III | IV | V | VI | VII | VIII |
| Combination of Tread Rubber CTR/BTR | C-1/B-1 | C-2/B-1 | C-3/B-1 | C-3/B-3 | C-4/B-4 | C-5/B-2 | C-5/B-4 | C-6/B-3 |
| Rolling Resistance | 111 | 100 | 82 | 81 | 83 | 80 | 81 | 82 |
| Wet Grip Performance | 107 | 100 | 105 | 104 | 101 | 103 | 102 | 102 |

Note:
Samples No. I and No. II show the results of the conventional treads for comparison purpose and the samples No. III to No. VIII are the embodiments of the present invention. The respective results are shown for comparison by means of an index by setting the results of the sample No. II as 100.
Rolling Resistance—According to the TWIN ROLL system in the measuring method described in the "Report of U.S. Society of Automotive Engineers SAE", No. 770875, the rolling resistance was measured with the inner pressure of 3.15 kg/cm$^2$ and a load of 336 kg. It was compared with each other by means of an index. The smaller the value is, the better it is.
Wet Grip Performance—According to the method set by Uniform Tire Quality Grading, UTQGS, a tire was mounted to a test trailer using a 5J×14 rim and the friction resistance was measured with the rotation of the tire locked during driving over a wet dense grain size asphalet surface with the inner pressure of 1.8 kg/cm$^2$ and a load of 336 kg. The results are shown by means of an index. The larger the value is, the better the wet grip performance is.

The test results show that the loss tangents and the resiliences are highly correlated with the rolling resistances. Apparent from Table 1, the lower the loss tangent is and the higher the resilience is in the cap tread rubber, the better the rolling resistance is. It should be apparent that the loss tangent lower than the value of the conventional composition No. C-2, i.e., the loss tangent at most not more than 0.24 and the resilience more than 60% higher than the resilience value of conventional compositions achieved good result. This means that the use of star shaped SBR makes it possible to obtain proper loss tangent and resilience. The use of a lower value of the loss tangent and a more preferable value of resilience than that of a conventional composition gives an improved rolling resistance with improved wet grip performance. Thus, there is provided a tread which shows well balanced excellent characteristics in the rolling resistance and wet grip performance.

Furthermore, it should be also apparent from Table 2 that the combination of a cap tread rubber with a base tread rubber having a value of a loss tangent lower than that of the cap tread rubber gives a much better low rolling resistance.

Comparing with a general integral tread, a rolling resistance is 74 to 76% and a equal or better wet grip performance is obtained.

What is claimed is:

1. An automotive tire tread having a low rolling resistance comprising a cap tread rubber and a base tread rubber, wherein solution polymerization star-shaped SBR is used for said cap tread rubber, the value of the loss tangent of said cap rubber being not more than 0.24 at 50 Hz frequency, 5% dynamic strain and 30° C., the value of the resilience of said cap rubber being more than 60% in accordance with BS-903 at 23° C. and the value of the loss tangent of the base tread rubber is less than that of the cap tread rubber.

2. A tire tread having a low rolling resistence according to claim 1, wherein the volume of said cap rubber occupies 60% to 70% of the total volume of the tread.

3. A tire tread having a low rolling resistence according to claim 1, wherein solution polymerization star-shaped SBR is also used for said base tread rubber.

4. A tire tread having a low rolling resistance according to claim 1 or claim 3, wherein the solution polymerization star shaped SBR contains styrene less than 20%, preferably more than 10% and vinyl less than 50% and the glass transition temperature (Tg) less than −50° C.

* * * * *